United States Patent
Gupta et al.

(10) Patent No.: US 11,558,454 B2
(45) Date of Patent: Jan. 17, 2023

(54) GROUP LEADER ROLE QUERIES

(71) Applicant: HEWLETT PACKARD ENTERPRISE DEVELOPMENT LP, Houston, TX (US)

(72) Inventors: Manan Gupta, San Jose, CA (US); Ruta Vaidya, San Jose, CA (US); Sudhanshu Rajvaidya, Fremont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 966 days.

(21) Appl. No.: 16/051,144

(22) Filed: Jul. 31, 2018

(65) Prior Publication Data

US 2020/0045105 A1 Feb. 6, 2020

(51) Int. Cl.
| | |
|---|---|
| H04L 29/08 | (2006.01) |
| H04L 67/104 | (2022.01) |
| H04L 69/40 | (2022.01) |
| H04L 61/4511 | (2022.01) |

(52) U.S. Cl.
CPC ...... H04L 67/1048 (2013.01); H04L 61/4511 (2022.05); H04L 67/1051 (2013.01); H04L 69/40 (2013.01)

(58) Field of Classification Search
CPC . H04L 67/1048; H04L 61/1511; H04L 69/40; H04L 67/1051; H04L 61/1541; H04L 12/18; H04L 67/16
See application file for complete search history.

(56) References Cited

U.S. PATENT DOCUMENTS

| | | | |
|---|---|---|---|
| 7,739,677 B1 | 6/2010 | Kekre et al. | |
| 7,843,811 B2 | 11/2010 | Armstrong et al. | |
| 8,498,967 B1 | 7/2013 | Chatterjee et al. | |
| 8,560,628 B2 | 10/2013 | Ganti et al. | |
| 9,450,852 B1 | 9/2016 | Chen et al. | |
| 9,456,356 B2* | 9/2016 | Bradley | H04W 24/02 |
| 9,658,912 B2 | 5/2017 | Gao | |
| 10,003,642 B2* | 6/2018 | Vandwalle | H04W 56/0015 |
| 2012/0254342 A1* | 10/2012 | Evans | H04L 67/1097 709/214 |
| 2013/0297757 A1* | 11/2013 | Han | H04L 41/40 709/222 |
| 2016/0080200 A1* | 3/2016 | Ishii | H04L 61/2069 709/211 |

(Continued)

OTHER PUBLICATIONS

Decandia, G. et al., "Dynamo: Amazon's Highly Available Key-value Store," Oct. 14-17, 2007, 16 pages, http://www.read.seas.harvard.edu/~kohler/class/cs239-w08/decandia07dynamo.pdf.

(Continued)

*Primary Examiner* — Gil H. Lee
*Assistant Examiner* — Juan C Turriate Gastulo
(74) *Attorney, Agent, or Firm* — Trop, Pruner & Hu, P.C.

(57) ABSTRACT

Examples include group leader role queries. Examples include detection of a loss of communication, via a first communication protocol, between first and second computing devices, transmission, via a second communication protocol, of a query for information about the second computing device currently having the group leader role. Examples further include a determine not to assume the group leader role with the first computing device based on receiving a response to the query via the second communication protocol from the second computing device.

20 Claims, 5 Drawing Sheets

(56) References Cited

U.S. PATENT DOCUMENTS

| | | | | |
|---|---|---|---|---|
| 2018/0262792 | A1* | 9/2018 | Mackay | H04N 21/4305 |
| 2018/0280797 | A1* | 10/2018 | Murakami | A63F 13/335 |
| 2018/0315035 | A1* | 11/2018 | Johnson | H04L 67/02 |
| 2019/0347352 | A1* | 11/2019 | Gochkov | G06F 11/2094 |

OTHER PUBLICATIONS

Gupta et al., "On scalable and efficient distributed failure detectors," 2001, Proceedings of the Twentieth Annual ACM Symposium on Principles of Distributed Computing (PODC '01), pp. 170-179.

Nimble Storage, Inc., "Nimble Storage Windows Integration Guide Nimble OS Version 2.1.x," Mar. 20, 2014, P/N 970-0014-001.

Nimble Storage, Inc., "Nimble Storage Windows Toolkit Guide Version 1.4.2," Jul. 29, 2013, P/N 990-0142-001.

S. Cheshire et al., "Multicast DNS," Feb. 2013, Internet Engineering Task Force (IETF), Request for Comments: 6762, <https://tools.ietf.org/pdf/rfc6762.pdf>.

Wikipedia, "IP multicast," May 14, 2018, <https://en.wikipedia.org/w/index.php?title=IP_multicast&oldid=841244054>.

Wikipedia, "Multicast DNS," May 18, 2018, <https://en.wikipedia.org/w/index.php?title=Multicast_DNS&oldid=841813409>.

Wikipedia, "Multicast," May 17, 2018, <https://en.Wikipedia.org/w/index.php?title=Muiticast&old id=841702216>.

Charles Keenan, "Setting Up an HP-UX CSE Serviceguard Cluster," available online at <https://www.informit.com/articles/article.aspx?p=349748&seqNum=4>, HP-UX CSE: Official Study Guide and Desk Reference, Section 25.4, Nov. 24, 2004, 2 pages.

Gerend et al., "Deploy a Cloud Witness for a Failover Cluster," available online at <https://web.archive.org/web/20170710194637/https://docs.microsoft.com/en-us/windows-server/failover-clustering/deploy-cloud-witness>, Sep. 15, 2016, pp. 1-10.

John Marlin, "Failover Cluster File Share Witness and DFS," available online at <https://techcommunity.microsoft.com/t5/failover-clustering/failover-cluster-file-share-witness-and-dfs/ba-p/372147>, Apr. 13, 2018, 7 pages.

* cited by examiner

GROUP LEADER ROLE QUERIES

BACKGROUND

Computing devices, such as servers, storage arrays, and the like, include may communicate with one another over one or more computer network(s). In some examples, a computing device may perform various service(s) on behalf of other computing device(s), manage or coordinate functionalities involving multiple connected computing devices, or the like. In such examples, loss of communication over the computer network(s) may have a detrimental effect.

BRIEF DESCRIPTION OF THE DRAWINGS

The following detailed description references the drawings, wherein.

DETAILED DESCRIPTION

Figure 1:
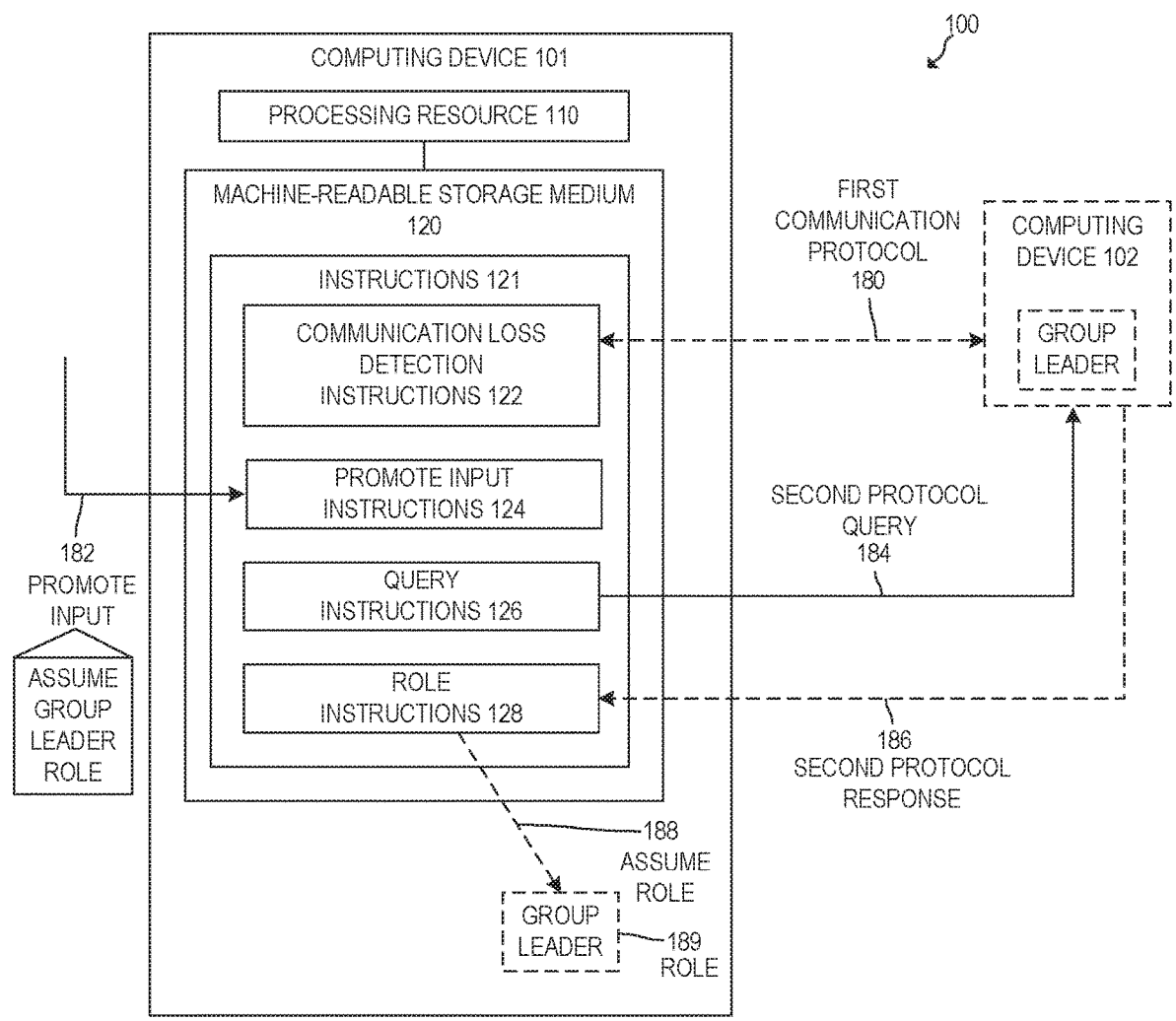
FIG. 1 is a block diagram of an example computing environment including a computing device to send a query for a computing device having a group leader role.

As noted above, loss of communication between computing devices over one or more computer network(s) may have a detrimental effect. For example, a plurality of computing devices, in communication with one another via computer network(s), may form a group (or "cluster") of computing devices that interact with one another to perform certain functionalities, such as data replication, for example. In such examples, one of the computing devices may be a leader of the group, referred to herein as having a "group leader" role. The computing device having the group leader role may perform various functionalities on behalf of the group, such as management services like, for example, a Representational State Transfer (REST) application programming interface (API) endpoint, a command line interface (CLI) endpoint, or the like.

In some examples, the computing device having the group leader role may also maintain an authoritative record of metadata for the group or cluster (e.g., in a database). For example, when the computing devices include storage arrays in replication relationships to replicate the contents of various volumes to one another, the computing device having the group leader role may maintain an authoritative record of the computing devices (e.g., storage arrays) in the group, information about those computing devices (e.g., internet protocol (IP) addresses, etc.), and information about replication relationships in the group, such as information on each volume stored by the storage arrays and the replication relationships between the volumes of the arrays. For example, this information may specify, for each volume, which storage array owns the upstream (or source) version of the volume, which storage array stores a downstream (or destination) version of the volume (to receive replication of data from the upstream version), what replication pool each volume is assigned to, etc.

In such examples, it may be desirable to promote another computing device of the group to a "backup group leader" role for the group so that the computing device with the backup group leader role (which may be referred to herein as the "backup group leader") may take over the group leader role in case the current computing device having the group leader role (which may be referred to herein as the "group leader") experiences issue(s), such as a loss of communication with other computing device(s), a restart, a shutdown, or the like.

In such examples, a backup group leader may assume the group leader role when it detects a loss of communication between itself and the current group leader. However, if the group leader has not actually failed, or has only lost communication with some of the group while maintaining communication with other computing device(s) in the group, the backup group leader assuming the group leader role in this scenario may lead to a "split brain" situation, in which there are multiple computing devices claiming to be the group leader (e.g., the existing group leader, which has not completely failed, and the backup group leader, which has assumed the group leader role on the mistaken assumption that the existing group leader has failed). Such a split brain scenario may be detrimental, as two different computing devices may assert to have the authoritative view of the information about the group (e.g., about the computing devices and replication relationships, etc.), which may diverge over time, and may both attempt to provide the above-described group services to the group.

To address these issues, in examples described herein, a first computing device (e.g., a backup group leader) may detect a loss of communication between the first computing device and a second computing device (e.g., a group leader) via a first communication protocol, receive a promote input instructing the first computing device to assume the group leader role and, in response, send, via a different second communication protocol, a query for information about the second computing device currently having the group leader role. In such examples, based on receiving a response to the query via the second communication protocol from the second computing device (e.g., the current group leader), the first computing device (e.g., the backup group leader) may determine not to assume the group leader role. Alternatively, based on receiving no response to the query from the second computing device (e.g., the current group leader) via the second communication protocol within a threshold period of time, the first computing device (e.g., the backup group leader) may assume the group leader role. In some examples, the second communication protocol may be a multicast Domain Name System (mDNS) protocol.

In this manner, examples described herein may avoid the above-described split brain situation by the backup group leader not assuming the group leader role when the backup group leader has detected a loss of communication with the group leader via a first protocol but is also able to verify, via a second protocol, that the group leader has not failed completely and is still able to communicate. In such examples, the backup group leader not assuming the group leader role in this case may avoid the split brain scenario that may arise if the backup group leader were to take over the group leader role while the existing group leader has not failed completely and is still able to communicate. In such examples, the backup group leader may assume the group leader role when the backup group leader is not able to verify, via the second protocol, that the group leader has not failed completely, as there is less risk of the split brain scenario in such cases.

Referring now to the drawings, FIG. 1 is a block diagram of an example computing environment 100 including a computing device 101 to send a query for a computing device 102 having a group leader role. In the example illustrated in FIG. 1, computing device 101 includes at least one processing resource 110 and at least one machine-readable storage medium 120 comprising (e.g., encoded with) at least storage instructions 121 that are executable by the at least one processing resource 110 of computing device 101 to implement functionalities described herein in relation to instructions 121. Instructions 121 may include at least instructions 122, 124, 126, and 128, which may be executable by the at least one processing resource 110.

Computing devices 101 and 102 may be part of a group of computing devices, in which computing device 102 has the group leader role. In such examples, computing device 101 may have the backup group leader role for the group. In such examples, computing device 101 may have assumed (e.g., been promoted to) the group leader role, as described below.

In the example illustrated in FIG. 1, instructions 122 of computing device 101 may detect a loss of communication, via a first communication protocol 180, between computing device 101 and computing device 102 of the group of computing devices. For example, instructions 122 may utilize a first communication protocol 180, such as the Internet Control Message Protocol (ICMP), to exchange messages with computing device 102 to confirm that computing device 102 is available (e.g., not failed, offline, etc.). For example, computing device 101 (e.g., instructions 122) and computing device 102 may utilize ICMP echoes and replies (or otherwise ping one another) to determine whether the other is still available. In some examples, instructions 122 may send computing device 102 an ICMP echo request (or the like) on a periodic basis (e.g., every five seconds, or any other suitable period of time), and monitor for computing device 102 to reply. Instructions 122 may have a threshold amount of time within which it expect to receive a reply from computing device 102 to the echo request (e.g., every five seconds, or any other suitable period of time). When instructions 122 receive a reply to the echo request within that threshold amount of time, instructions 122 may determine, via the first protocol (e.g., ICMP), that computing device 102 is still available. However, when instructions 122 fail to receive the expected reply to the echo request from computing device 102 within the threshold amount of time, either once or a threshold number of times, then instructions 122 may detect a loss of communication, via a first communication protocol 180, between computing device 101 and computing device 102.

After the detection of the loss of communication, instructions 124 may receive a promote input 182 instructing computing device 101 (e.g., the backup group leader) to assume the group leader role for the group of computing devices including computing device 101 and 102. In some examples, instructions 122 may output an alert or other notification that the loss of communication has been detected. For example, instructions 122 may output the notification via an interface such as a user interface (e.g., a graphical user interface (GUI)) of computing device 101 or another computing device. In such examples, a user (such as an administrator, or the like) may provide the promote input 182 to computing device 101 via the user interface of computing device 101 or another computing device.

In response to receiving the promote input, instructions 126 may send, via a second communication protocol different than the first communication protocol, a query 184 for information about computing device 102 currently having the group leader role. In some examples, this query 184 may be multicast on one or more computer network(s) to which computing device 101 is connected (e.g., directly or indirectly). In some examples, the second communication protocol may be a multicast Domain Name System (mDNS) protocol. In such examples, the query 184 may be an mDNS query. In some examples, the mDNS query may be a targeted query that specifies identifier(s) (e.g., serial number, etc.) of the group leader, computing device 102. In other examples, the query 182 may be multicast to computing devices in computer network(s) to which computing device 101 is directly or indirectly connected, and computing device 101 may filter the responses based on identifier(s) of the group leader, computing device 102.

In the example illustrated in FIG. 1, based on receiving a response 186 to query 184 from computing device 102 via the second communication protocol (e.g., within a threshold period of time), instructions 128 may determine not to assume the group leader role (i.e., with computing device 101) in response to promote input 182. In such examples, computing device 101 has confirmed that computing device 102 has not completely failed, and that there are still available network path(s) to reach computing device 102, for example. In such examples, computing device 101 assuming the group leader role may cause a split brain in the group of computing devices (i.e., two group leaders), as described above.

In the example illustrated in FIG. 1, based on receiving no response to query 184 from computing device 102 via the second communication protocol within the threshold period of time, instructions 128 may cause computing device 101 to assume 188 the group leader role in the group of computing devices (i.e., assume 188 the group leader role with computing device 101), which instructions 128 may record in storage of computing device 101 (as described below).

In examples described herein, the threshold amount of time within which it expect to receive a reply to a request of the first protocol (e.g., a reply to an ICMP echo request) may be different from the threshold period of time for receiving a response to a query of the second protocol (e.g., a response to an mDNS request). As used herein, functionalities described as performed by instructions 121 may be performed by execution of any of instructions 122, 124, 126, and 128, or other instructions among instructions 121. Similarly, functionalities described as performed by instructions 122, 124, 126, or 128 may be considered to be functionalities performed by instructions 121 (which include instructions 122, 124, 126, and 128). In examples described herein, functionalities described as being performed by "instructions" may be understood as functionalities that may be performed by those instructions when executed by a processing resource. In other examples, functionalities described in relation to instructions 121 may be implemented by one or more engines, which may be any combination of hardware and programming to implement the functionalities of the engine(s). In some examples, functionalities described herein in relation to FIG. 1 may be provided in combination with functionalities described herein in relation to any of FIGS. 2-5.

Figure 2:
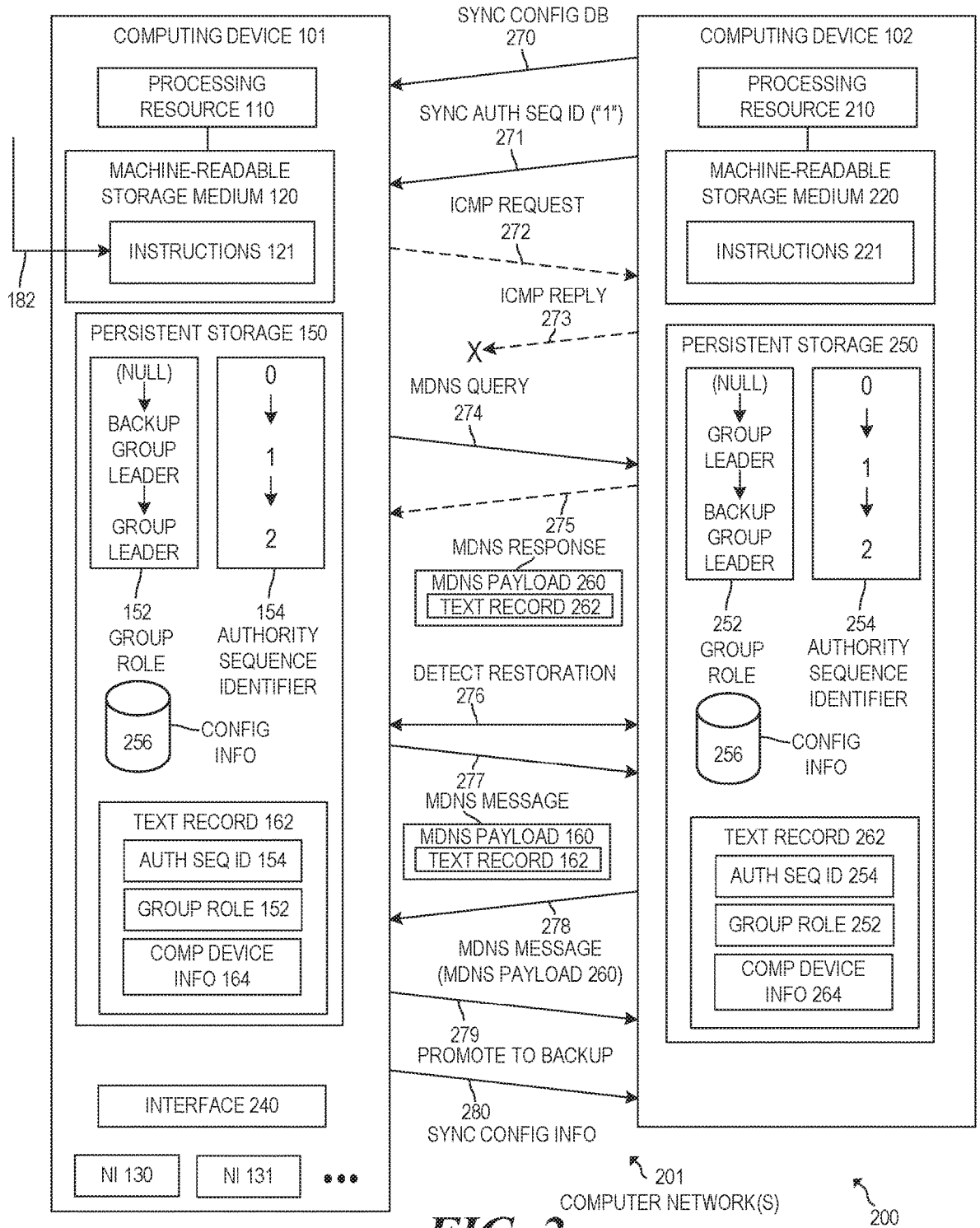
FIG. 2 is a block diagram of an example group of computing devices including a computing device to send a multicast Domain Name System (mDNS) query in response to receiving a promote input.

FIG. 2 is a block diagram of an example group of computing devices 200 including a computing device 101 to send an mDNS query in response to receiving a promote input. The example illustrated in FIG. 2 is different than the example illustrated in FIG. 1, but for ease of illustration, expands on the example illustrated in FIG. 1, as described above. However, the examples described in relation to FIG. 2 are not be construed as limiting the examples described above in relation to FIG. 1.

The example illustrated in FIG. 2 includes a group of computing devices 200, comprising at least computing devices 101 and 102, which may communicate with one another via one or more computer network(s) 201. In examples described herein, a computer network may include, for example, a local area network (LAN), a virtual LAN (VLAN), a wireless local area network (WLAN), a virtual private network (VPN), the Internet, or the like, or a combination thereof.

In the example illustrated in FIG. 2, computing device 101 comprises processing resource 110, storage medium 120, and instructions 121, as described above. In the example illustrated in FIG. 2, computing device 101 may further include persistent storage 150, which may be implemented by any suitable type of non-volatile storage (e.g., a solid state storage (SSD) device(s), such as flash device(s), or a hard disk drive(s) (HDDs), or the like). Computing device 101 may further include a plurality of network interfaces (Nis) 130, 131, etc., and an interface 240.

In the example illustrated in FIG. 2, computing device 102 may include a machine-readable storage medium 210 to store instructions 221 (which may be equivalent to instructions 121 in some examples), at least one processing resource 210 to execute instructions 221, persistent storage 250, which may be implemented as described above in relation to persistent storage 150.

Computing device 102 may store an indication of its group role 252, its authority sequence identifier 254, and group configuration information 256 (e.g., a configuration database) in persistent storage 250. In examples described herein, group roles may include the group leader role, the backup group leader role, or a member role. In such examples, the member role may be the role held initially by each computing device in a group, and is held by every computing device that is not either the group leader or the backup group leader. In examples described herein, authority sequence identifiers may be used in process(es) for determining which computing device is to be a group leader among the computing devices in a group.

In such examples, each computing device in the group may store an initial value for the authority sequence identifier that is not associated with either the group leader or the backup group leader role. When a computing device assumes the group leader role, it may change (e.g., increment) its authority sequence identifier, and when a computing device assumes the backup group leader role, it may replace its stored authority sequence identifier with the authority sequence identifier provided to it by the group leader.

For example, in the example illustrated in FIG. 2, as part of computing device 102 assuming the group leader role, instructions 221 may replace the "null" group role 252 of computing device 102 stored in persistent storage 250 with an indication 252 in persistent storage 250 that computing device 102 has the group leader role. Instructions 221 may also increment the authority sequence identifier 254 stored in persistent storage 250 from an initial value of "0" (which is the authority sequence identifier for all computing devices with a member role), to an authority sequence identifier 254 having a value of "1" (and stored in persistent storage 250). In addition, since computing device 102 is the group leader, instructions 221 may also start a plurality of group services for the group of computing devices 200. Among the plurality of group services, instructions 221 may implement one or more of, for example, a REST API endpoint, a CLI endpoint, an Internet Small Computer Systems Interface (iSCSI) discovery endpoint, a GUI web server, a simple network management protocol daemon (SNMPD), a database, or the like. In some examples, group configuration information 256 may hold an authoritative record of the computing devices (e.g., storage arrays) in the group, information about those computing devices (e.g., IP addresses, etc.), and relationships among the computing devices (e.g., replication relationships, etc.). In some examples, group configuration information 256 may be implemented as a database.

In some examples, the computing devices of the group 200 may be respective storage arrays that implement replication of volumes between them. In such examples, group configuration information 256 may, as described above, include information about replication relationships in the group, such as information on each volume stored by the storage arrays and the replication relationships between the volumes of the arrays. For example, this information may specify, for each volume, which storage array owns the upstream (or source) version of the volume, which storage array stores a downstream (or destination) version of the volume (to receive replication of data from the upstream version), what replication pool each volume is assigned to, and the like.

Instructions 221 may also store a text record 262 in persistent storage 250 of computing device 102 (or in another machine-readable storage medium of computing device 102). The text record 262 may be included in an mDNS payload 260 that instructions 221 may send via mDNS. In examples described herein, an mDNS payload may be information that a computing device publishes in the mDNS protocol (e.g., in response to an mDNS query). In examples described herein, computing devices in a group of computing devices may utilize a text record portion of the mDNS payload to include various types of information specific to the group of computing devices and useable in the process of determining the group leader of the group. For example, an mDNS payload of a computing device may include, in the text record of the mDNS payload, the name of the computing device, a group identifier, a serial number (or other device identifier), an authority sequence identifier, a group role (e.g., group leader, backup group leader, or null), and the like, for example. In the example illustrated in FIG. 2, mDNS payload 260 may include text record 262, including authority sequence identifier 254 (i.e., "1"), group role 252 (e.g., an indication of the group leader role), and certain computing device information 264 (e.g., the name and serial number of computing device 102, and an indication that computing device 102 is part of group of computing devices 200).

After computing device 102 has assumed the group leader role and stored its incremented authority sequence identifier 254 ("1") and group leader role 252 in persistent storage 250, computing device 102 may promote computing device 101 to the role of backup group leader. In such examples, instructions 221 may begin synchronizing 270 group configuration information 256 to computing device 101. For example, instructions 221 may provide group configuration information 256 to computing device 101, and instructions 121 may acquire group configuration information 256 from computing device 102 and store a copy in persistent storage 150 of computing device 101. In such examples, instructions 121 may further periodically synchronize the acquired group configuration information 256 stored in persistent storage 250 of computing device 101 with group configuration information 256 stored on computing device 102 (e.g., while computing device 101 has the backup group leader role).

In the example illustrated in FIG. 2, computing device 101 may store, in persistent storage 150, an initial null value for its group role 152 (i.e., a member role) and an initial value of "0" for its authority sequence identifier 154. When computing device 102 is promoting computing device 101 to the backup group leader role, instructions 221 may further provide (or synchronize) 271 the authority sequence identifier 254 ("1") of computing device 102 to computing device 101, which instructions 121 may receive and store in persistent storage 150 as the authority sequence identifier 154 of computing device 101 (i.e., replacing the prior value of "0").

In such examples, computing device 101 may assume the backup group leader role for the group of computing devices 200, and may store an indication 152 of its backup group leader role in persistent storage 152 of computing device 101 (i.e., replacing the prior "null" value). Instructions 121 may further store a text record 162 in persistent storage 150 of computing device 101 (or in another machine-readable storage medium of computing device 101). Text record 162 may be included in an mDNS payload 160 that instructions 121 may send via mDNS. In the example illustrated in FIG. 2, mDNS payload 160 may include, in text record 162, authority sequence identifier 154 (i.e., "1"), group role 152 (e.g., an indication of the backup group leader role), and certain computing device information 164 (e.g., the name and serial number of computing device 101, and an indication that computing device 101 is part of group of computing devices 200).

In the example illustrated in FIG. 2, the functionalities described above in relation to computing device 102 assuming the group leader role and computing device 101 assuming the backup group leader role (including the synchronization 270 of group configuration information 256 and the synchronization 271 of authority sequence identifier 254) may be performed before detecting a loss of communication between computing devices 101 and 102, as described below.

In the example illustrated in FIG. 2, instructions 121 of computing device 101 may detect a loss of communication, via a first communication protocol 180, between computing device 101 and computing device 102 of the group of computing devices, as described above. For example, instructions 121 may utilize ICMP as the first communication protocol. In such examples, instructions 121 may send computing device 102 ICMP echo requests 272 on a periodic basis, and monitor for ICMP responses 273 to the echo requests 272. When instructions 121 fail to receive, from computing device 102, the expected reply 273 to an echo request 272 within the threshold amount of time (either once or a threshold number of times) (as illustrated by ICMP reply 273 in FIG. 2), then instructions 121 may detect a loss of communication, via the first communication protocol (i.e., ICMP), between computing device 101 and computing device 102.

In such examples, after the detection of the loss of connection, instructions 121 may receive a promote input 182 instructing computing device 101 to assume the group leader role for the group of computing devices 200. In some examples, instructions 121 may output, via an interface 240 of computing device 101 (or another device), an alert or other notification that the loss of communication has been detected. In such examples, interface 240 may be a user interface, such as a GUI of computing device 101. In such examples, a user (such as an administrator, or the like) may provide the promote input 182 to computing device 101 via the interface 240. Interface 240 may be implemented by any combination of hardware and programming as described herein.

In response to receiving the promote input 182, instructions 121 may send an mDNS query 274 for information about computing device 102 that currently has group leader role. In such examples, mDNS is a second communication protocol different than the first communication protocol, ICMP. As described above, the mDNS query 274 may be a targeted query that specifies identifier(s) (e.g., serial number, etc.) of the group leader, i.e., computing device 102. In other examples, mDNS query 274 may be multicast to computing devices in computer network(s) to which computing device 101 is directly or indirectly connected, and instructions 121 may filter the responses based on identifier(s) of the group leader (i.e., computing device 102).

Based on receiving, from computing device 102, an mDNS response 275 to mDNS query 274 from computing device 102 within a threshold period of time (for mDNS responses), instructions 121 may determine not to assume the group leader role with computing device 101 in response to promote input 182. As described above, in such examples, computing device 101 has confirmed that computing device 102 has not completely failed, and that there are still available network path(s) to reach computing device 102, for example. In such examples, computing device 101 assuming the group leader role may cause a split brain in the group of computing devices (i.e., two group leaders), as described above. In examples described herein, mDNS response 275 may include an mDNS payload 260, including text record 262 of computing device 102, and instructions 121 may use contents of text record 262 to identify mDNS response 275 as being from computing device 102. In some examples, in response to receiving mDNS response 275 to mDNS query 274 from computing device 102 within the threshold period of time, instructions 121 may output an error via interface 240 (e.g., a user interface) of computing device 101 or another computing device. In such examples the error may indicate that the promote input 182 was not followed in response to the determination that computing device 102 (the group leader) has not complete failed.

In other examples, based on receiving no mDNS response 275 (i.e., including mDNS payload 260 with text record 262) to mDNS query 274 from computing device 102 within the threshold period of time (for mDNS responses), instructions 121 may cause computing device 101 to assume the group leader role in the group of computing devices 200. As part of assuming the group leader role with computing device 101, instructions 121 may record, in persistent storage 150, an indication 152 that computing device 101 has the group leader role. The indication 152 of the group leader role may replace the prior indication of computing device 101 having the backup group leader role in persistent storage 150.

Also as part of assuming the group leader role with computing device 101, instructions 121 may modify the authority sequence identifier 154 stored in persistent storage 150. For example, instructions 121 may increment authority sequence identifier 154 from a value of "1" to a value of "2". Also as part of assuming the group leader role with computing device 101, instructions 121 may modify text record 162 stored on computing device 101. Instructions 121 may modify text record 162 to include the modified authority sequence identifier 154 (i.e., "2") and the indication 152 that computing device 101 has the group leader role. As part of assuming the group leader role with computing device 101, instructions 121 may also start, at computing device 101, a plurality of group services for the group of computing devices 200, as described above in relation to computing device 102. In such examples, the plurality of group services for group 200 are provided (e.g., run, executed, etc.) by the computing device having the group leader role for the group 200.

After computing device 101 has assumed the group leader role, as described above, instructions 121 may subsequently detect restoration 276 of communication between the first and second computing devices 101 and 102. For example, after assuming the group leader role, instructions 121 may periodically send mDNS queries (as described above in relation to mDNS query 274) for information about computing device 102 that it has lost communication with, and may detect the restoration of communication based on receiving an mDNS response from second computing device 102. In such examples, in response to detecting the restoration, instructions 121 may provide, to computing device 102, an mDNS message 277, including mDNS payload 160, comprising text record 162. In such examples, the mDNS payload 160 of message 277 includes the text record 162, as modified by instructions 121 when computing device 101 assumed the group leader role, including the modified authority sequence identifier 154 (i.e., "2") and the modified indication 152 that computing device 101 has the group leader role. In such examples, instructions 121 may also receive an mDNS message 278 from computing device 102, the received mDNS message 278 including mDNS payload 260 having a text record 262 including the current authority sequence identifier 254 (i.e., "1") of computing device 102, and an indication 252 of the group leader role claimed by computing device 102. In such examples, computing device 102 still claims the group leader role, even though computing device 101 has assumed the group leader role already, since computing device 101 assumed the group leader role during the detected loss of communication between computing devices 101 and 102. Accordingly, computing device 101 and 102 may reconcile who will be the group leader to avoid the split brain scenario described above.

In such examples, instructions 121 may compare the received authority sequence identifier 254 ("1") of computing device 102 with the modified authority sequence identifier 154 ("2") of computing device 101. Based at least on a result of the comparison, instructions 121 may keep computing device 101 in the group leader role. For example, among these computing devices 101 and 102, the computing device having the higher authority sequence identifier will continue as the group leader, which in the example described above is computing device 101 having an authority sequence identifier of "2", compared to computing device 102 having an authority sequence identifier of "1".

In such examples, computing device 102 may then transition to a member role, with instructions 221 storing a null value for group role indicator 252 in persistent storage 250 and text record 262, and with instructions further storing an authority sequence identifier 254 of "0" in persistent storage 250 and text record 262. Computing device 101 may subsequently promote computing device 102 to the backup group leader role.

Subsequently, instructions 121 may promote 279 computing device 102 to the backup group leader role. As part of computing device 102 assuming the backup group leader role, instructions 221 may record an indication 252 that computing device 102 has the backup group leader in persistent storage 250 and in text record 262 (e.g., to replace the prior group role indication 252 that was stored in persistent storage 250 and text record 262). Instructions 221 may also receive the authority sequence identifier 154 ("2") of computing device 102 and record it as its authority sequence identifier 254 ("2") in persistent storage 250 and in text record 262 (e.g., to replace the prior authority sequence identifier 254 that was stored in persistent storage 250 and text record 262). In such examples, instructions 121 of computing device 101 may also begin synchronizing 280 configuration information 256 from computing device 101 to computing device 102. In such examples, instructions 221 may receive the synchronization of configuration information 256 and store it in persistent storage 250.

In some examples, the loss of communication detected by instructions 121 may be associated with a network interface (NI) 130 (e.g., network interface card (NIC), or the like) of computing device 101. For example, instructions 121 may be utilizing network interface 130 of computing device 101 for the ICMP echoes and replies. In such examples, instructions 121 may send ICMP request 272 to computing device 102 via network interface 130, and then fail to receive the expected ICMP reply 273 via network interface 130 within the threshold amount of time, as described above.

In such examples, in response to receiving promote input 182 (after detecting the loss of communication), instructions 121 may send a plurality of mDNS queries 274 for information about computing device 102 via a plurality of network interfaces 130, 131, ..., of computing device 101, including network interface 130. In such examples, the mDNS query 274 may be provided across each broadcast domain (or virtual local area network (VLAN)) connected to computing device 101, to give a greater chance of the mDNS request 274 reaching computing device 102, if it is reachable.

Although two network interfaces of computing device 101 are shown for ease of illustration, in other examples, each of computing devices 101 and 102 may have more or fewer network interfaces. Although two computing devices 101 and 102 are shown in group of computing devices 200 in FIG. 2, in other examples, group of computing devices 200 may include additional computing devices. Although integers are used herein as example authority sequence identifiers for ease of illustration, any suitable type of identifier may be used for authority sequence identifiers in examples described herein.

As noted above, in examples described herein, instructions 221 may be equivalent to instructions 121. In such examples, any of the functionalities described herein in relation to instructions 121 may also be performed by instructions 221, and any of the functionalities described herein in relation to instructions 221 may also be performed by instructions 121. In some examples, functionalities described herein in relation to FIG. 2 may be provided in combination with functionalities described herein in relation to any of FIGS. 1 and 3-5.

Figure 3:
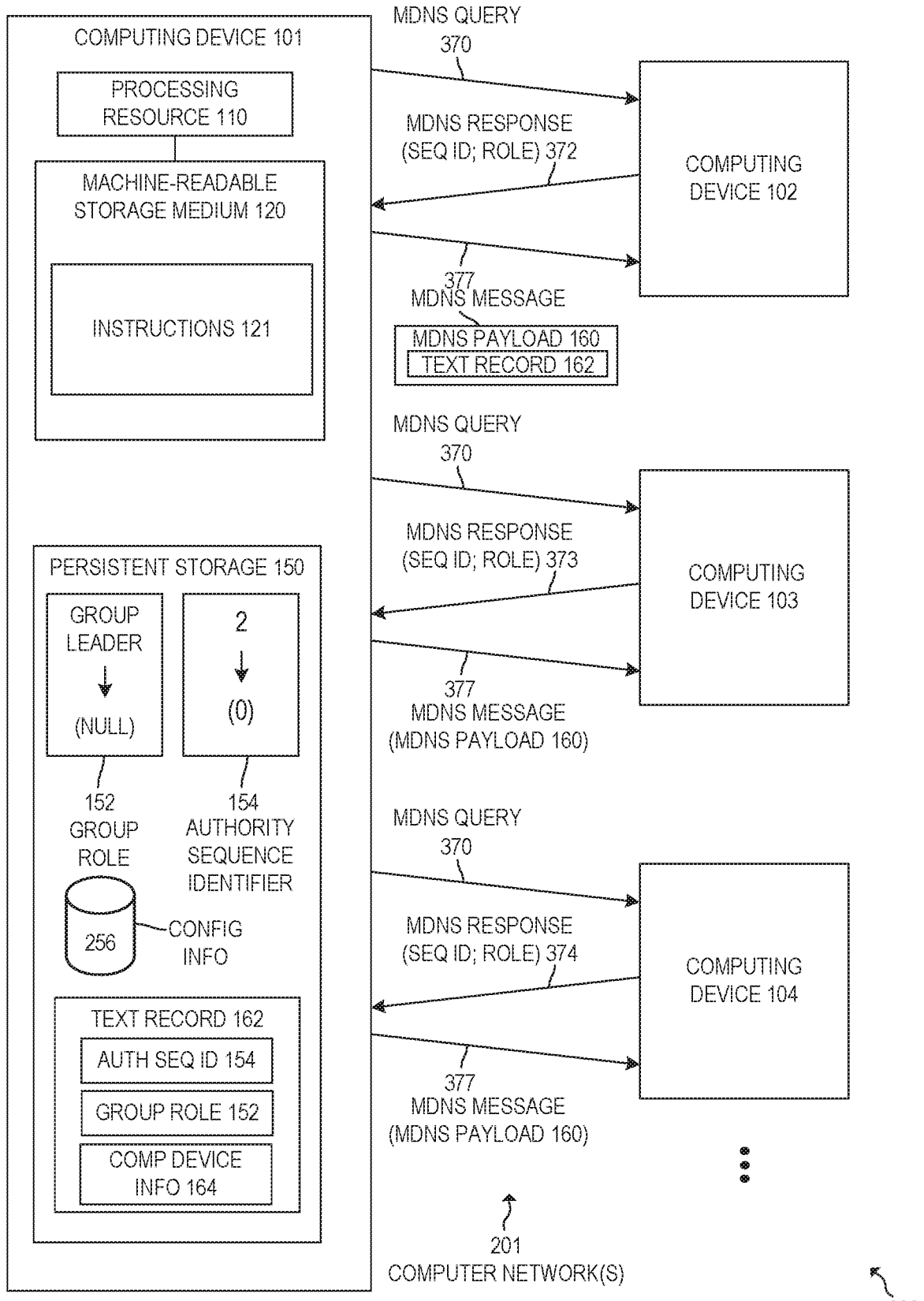
FIG. 3 is a block diagram of an example group of computing devices including a computing device to begin or cede a group leader role after startup.

FIG. 3 is a block diagram of an example group of computing devices 300 including a computing device to begin or cede a group leader role after startup. The example illustrated in FIG. 3 is different than the examples illustrated in FIGS. 1 and 2, but for ease of illustration, expands on the examples illustrated in FIGS. 1 and 2, as described above. However, the examples described in relation to FIG. 3 are not be construed as limiting the examples described above in relation to FIGS. 1 and 2.

The example illustrated in FIG. 3 includes a group of computing devices 300, comprising at least computing devices 101, 102, 103, and 104 which may communicate with one another via one or more computer network(s) 201.

In the example illustrated in FIG. 3, computing device 101 comprises processing resource 110, storage medium 120, instructions 121, persistent storage 150, and text record 162, as described above. In the example illustrated in FIG. 3, computing device 102 may include a machine-readable storage medium to store instructions 221 (which may be equivalent to instructions 121 in some examples), at least one processing resource to execute instructions 221, persistent storage 250, and text record 262, as shown in FIG. 2, and described above (though not shown in FIG. 3).

Computing device 103 may include a machine-readable storage medium to store instructions (which may be equivalent to instructions 121 in some examples), at least one processing resource to execute the instructions, persistent storage, and a text record (for an mDNS payload) (not shown), as described above in relation to computing device 102 in relation to FIG. 2. Computing device 104 may include a machine-readable storage medium to store instructions (which may be equivalent to instructions 121 in some examples), at least one processing resource to execute the instructions, persistent storage, and a text record (for an mDNS payload) (not shown), as described above in relation to computing device 102 in relation to FIG. 2.

Figure 4:
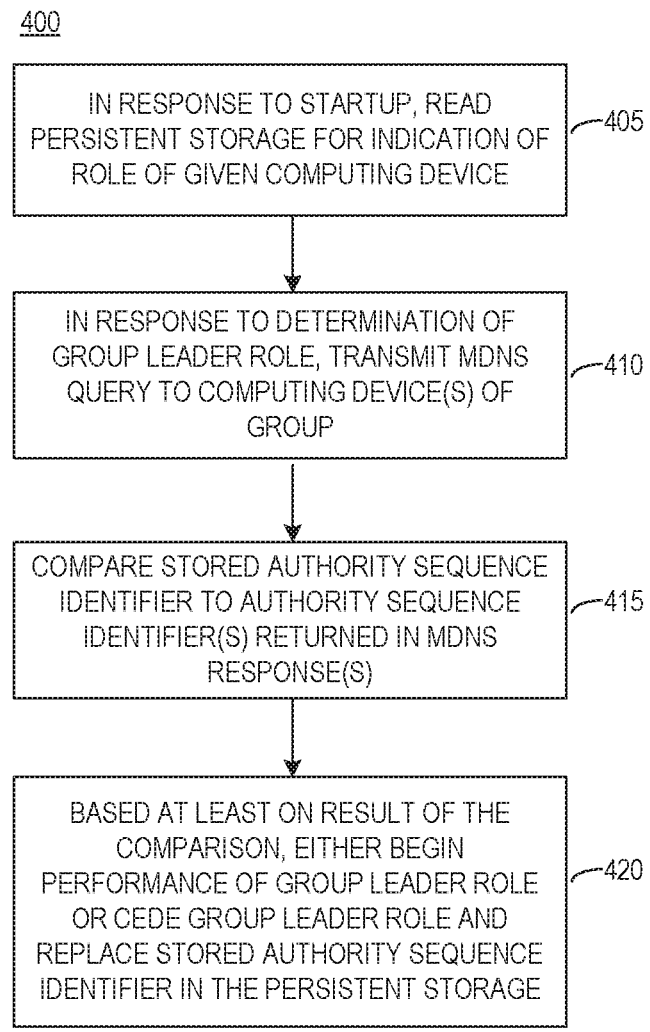
FIG. 4 is a flowchart of an example method including comparing a stored authority sequence identifier to authority sequence identifier(s) returned in mDNS response(s)

The example illustrated in FIG. 3 will be described below in relation to the methods of FIGS. 4 and 5. Although the methods of FIGS. 3 and 4 are described in relation to the example of FIG. 3, they may be implemented by groups of computing devices having two computing device, or by groups of computing devices having more than two computing devices (as illustrated in the example of FIG. 3). In some examples, functionalities described herein in relation to FIG. 3 may be provided in combination with functionalities described herein in relation to any of FIGS. 1-2 and 4-5.

FIG. 4 is a flowchart of an example method 400 including comparing a stored authority sequence identifier to authority sequence identifier(s) returned in mDNS response(s). Although execution of method 400 is described below with reference to computing device 101 of FIG. 3, other computing device suitable for the execution of method 400 may be utilized (e.g., computing devices 101, 102, 103, or 104 of any of FIGS. 1, 2, and 3). Additionally, implementation of method 400 is not limited to such examples.

At 405 of method 400, in response to a startup of computing device 101 (of group of computing devices 300), instructions 121 of computing device 101, when executed, may read persistent storage 150 of computing device 101 for an indication 152 of a role of computing device 101 for group of computing devices 300. In some examples (as shown in FIG. 3), an indication 152 in persistent storage 150 may indicate the computing device 101 has the group leader role for group of computing devices 300. In such examples, in response to a determination that persistent storage 150 indicates that computing device 101 has the group leader role for group of computing devices 300, at 410, instructions 121 of computing device 101 may transmit an mDNS query 370 to one or more computing devices of the group of computing devices 300. For example, instructions 121 may transmit mDNS query 370 to computing device 102 (e.g., when group of computing devices 300 has only two computing devices). In other examples, group of computing devices 300 may have more than two computing devices (as shown in FIG. 3), and in such examples instructions 121 may transmit mDNS query 370 to each of the other computing devices, such as computing devices 102, 103, 104, etc., as shown in FIG. 3.

Computing device 101 may receive one or more mDNS responses in response to the mDNS quer(ies) 370. For example, examples in which group of computing devices 300 has only two computing devices, instructions 121 may receive mDNS response 372 from computing device 102, for example. In other examples in which group of computing devices 300 has more than two computing devices (e.g., as shown in FIG. 3), instructions 121 may receive mDNS responses 372, 373, 374, etc., from computing devices 102, 103, 104, etc., respectively. Each mDNS response 372, 373, 374, etc., may include an mDNS payload as described above, including a text record having the computing device's authority sequence identifier and an indication of the computing device's claimed role. In some examples, the text record may also include an indication of which device that computing device has recorded as the group leader.

At 415, instructions 121 may compare the stored authority sequence identifier 154 (e.g., "2") of computing device 101 to one or more authority sequence identifiers provided in one or more mDNS responses 372, 373, 374, etc., to mDNS query 370, respectively. In such examples, the stored authority sequence identifier 154 may be stored in persistent storage 150 of computing device 101.

At 420, based at least on results of the comparing, instructions 121 may either begin performance of the group leader role with computing device 101 or cede the group leader role to another computing device of the group of computing devices 300 and replace (or at least in part by replacing) the authority sequence identifier 154 stored in persistent storage 154 of computing device 101 with a different identifier (e.g., "0"). For example, when instructions 121 determine that the stored authority sequence identifier 154 (e.g., "2") of computing device 101 is greater than each of the compared authority sequence identifiers provided in mDNS response(s) to mDNS query 370, then instructions 121 may begin performance of the group leader role with computing device 101, including, for example, starting the plurality of services performed by the group leader for the group of computing devices, as described above.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3 and 5.

Figure 5:
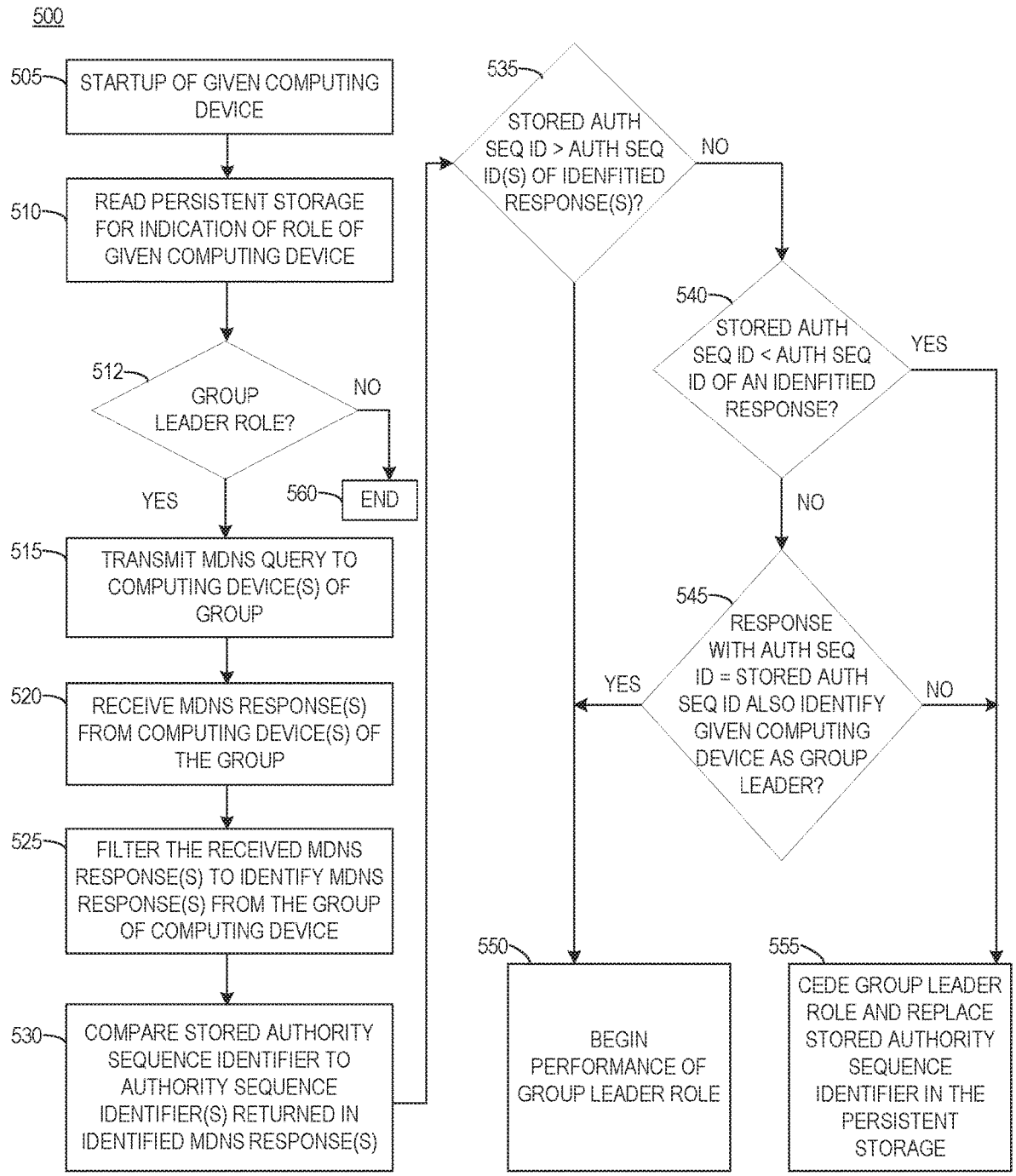
FIG. 5 is a flowchart of an example method including filtering received mDNS responses.

FIG. 5 is a flowchart of an example method 500 including filtering received mDNS responses. Although execution of method 500 is described below with reference to computing device 101 of FIG. 3, other computing device suitable for the execution of method 400 may be utilized (e.g., computing devices 101, 102, 103, or 104 of any of FIGS. 1, 2, and 3). Additionally, implementation of method 500 is not limited to such examples.

At 505 of method 500, computing device 101 may start up. Computing device 101 may be part of group of computing devices 300. At 510, in response to the startup of computing device 101, instructions 121 of computing device 101, when executed, may read persistent storage 150 of computing device 101 for an indication 152 of a role of computing device 101 for group of computing devices 300. At 512, instructions 121 may determine whether persistent storage 150 indicates 152 that computing device 101 has the group leader role. In response to a determination at 512 that persistent storage 150 indicates 152 that computing device 101 has a role other than the group leader role (e.g., either the backup group leader role, or has a null value, indicating a member role), method 500 may end at 560.

In other examples, in response to a determination that persistent storage 150 indicates 152 that computing device 101 has the group leader role (as illustrated in FIG. 3, for example), method 500 may proceed to 515. At 515, computing device 101 instructions 121 of computing device 101 may transmit an mDNS query 370 to one or more computing devices of the group of computing devices 300, as described above in relation to FIG. 4.

At 520, computing device 101 may receive one or more mDNS responses in response to the mDNS quer(ies) 370, as described above in relation to FIG. 4. Each mDNS response 372, 373, 374, etc., may include an mDNS payload as described above, including a text record having the computing device's authority sequence identifier, an indication of the computing device's claimed role, a group identifier (identifying the group of computing devices that the computing device belongs to), and an identifier of the computing device (e.g., serial number). In some examples, the text record may also include an indication of which device that computing device has recorded as the group leader.

At 525, instructions 121 may filter the mDNS response(s) received in response to the mDNS query 370 to identify the received mDNS response(s) from group of computing devices 300. In some examples, instructions 121 may filter the responses based on one or more of the computing device identifier (e.g., serial number) and group identifier included in the responses, to identify the mDNS responses from group of computing devices 300.

At 530, instructions 121 may compare the stored authority sequence identifier 154 (e.g., "2"), stored in persistent storage 150 of computing device 101, to the respective authority sequence identifier(s) provided in each of the mDNS response(s) identified as received from group of computing devices 300.

At 535, instructions 121 may determine whether the stored authority sequence identifier 154 is greater than each of the respective authority sequence identifier(s) provided in the identified mDNS response(s). If so, then method 500 may proceed to 550, where instructions 121 may begin performance of the group leader role with computing device 101, including beginning group services with computing device 101 for group of computing devices 300 (e.g., the plurality of services performed by the group leader for the group of computing devices, as described above). In some examples, beginning performance of the group leader role with computing device 101 may also include transmitting an mDNS message 377 to computing devices (e.g., each other computing device) of group of computing devices 300, where the mDNS message 377 comprises an mDNS payload 160, including a text record 162 including stored authority sequence identifier 154 (e.g., "2"), stored in persistent storage 150 of computing device 101, and an indication that computing device 101 has the group leader role.

In other examples, in which instructions 121 determine at 535 that stored authority sequence identifier 154 is not greater than each of the respective authority sequence identifier(s) provided in the identified mDNS response(s), method 500 may proceed to 540. At 540, instructions 121 may determine whether the stored authority sequence identifier 154 is less than at least one of the respective authority sequence identifier(s) provided in the identified mDNS response(s). If so, then method 500 may proceed to 555, where instructions 121 may cede the group leader role to another computing device of group of computing devices 300 and replace the authority sequence identifier 154 (e.g., "2") stored in the persistent storage of computing device 101 with a different identifier (e.g., "0" for a member computing device).

In other examples, instructions 121 may determine, at 540, that the stored authority sequence identifier 154 is not less than any of the respective authority sequence identifier(s) provided in the identified mDNS response(s). In such examples, method 500 may proceed to 545. At 545, instructions 121 may determine whether the stored authority sequence identifier 154 is equal to one of the respective authority sequence identifier(s) provided in one of the identified mDNS response(s), and that identified mDNS response indicates that computing device 101 has the group leader role. If so, then method 500 may proceed to 550 where instructions 121 may begin performance of the group leader role with computing device 101, as described above.

If not (i.e., the identified mDNS response having an authority sequence identifier equal to authority sequence identifier 154 indicate that a computing device other than computing device 101 has the group leader role), then method 500 may proceed to 55, where, as described above, instructions 121 may cede the group leader role to another computing device of group of computing devices 300 and replace the authority sequence identifier 154 (e.g., "2") stored in the persistent storage of computing device 101 with a different identifier (e.g., "0" for a member computing device).

Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. In some examples, functionalities described herein in relation to FIG. 5 may be provided in combination with functionalities described herein in relation to any of FIGS. 1-4.

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example illustrated in FIG. 1, storage medium 120 may be implemented by one machine-readable storage medium, or multiple machine-readable storage media.

In examples described herein, a storage array may be a computing device comprising a plurality of storage devices and one or more controllers to interact with host devices and control access to the storage devices. In some examples, the storage devices may include hard disk drives (HDDs), solid state drives (SSDs), or any other suitable type of storage device, or any combination thereof. In some examples, the controller(s) may virtualize the storage capacity provided by the storage devices to enable a host to access a virtual object (e.g., a volume) made up of storage space from multiple different storage devices.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), EEPROM, volatile memory, non-volatile memory, flash memory, a storage drive (e.g., a hard disk drive (HDD)), a solid state drive, any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising at least one non-transitory machine-readable storage medium comprising instructions executable by at least one processing resource of a first computing device of a group of computing devices to:

detect a loss of communication, via a first communication protocol, between the first computing device and a second computing device of the group of computing devices;

after detecting the loss of communication, receive, from an entity different from the first computing device, a promote input instructing the first computing device to assume a group leader role for the group of computing devices;

in response to receiving the promote input, send, via a second communication protocol different from the first communication protocol, a query for information about the second computing device currently having the group leader role;

determine, at the first computing device, whether a response to the query is received from the second computing device via the second communication protocol within a threshold period of time, wherein the threshold period of time is according to the second communication protocol;

in response to determining that the response to the query is received from the second computing device via the second communication protocol within the threshold period of time, determine not to assume the group leader role with the first computing device in response to the promote input; and in response to determining that no response to the query is received from the second computing device via the second communication protocol within the threshold period of time, assume the group leader role with the first computing device.

2. The article of claim 1, wherein the second communication protocol is a multicast Domain Name System (mDNS) protocol.

3. The article of claim 2, wherein the first communication protocol is an Internet Control Message Protocol (ICMP).

4. The article of claim 2, wherein the instructions are executable to, before detecting the loss of communication:
  receive an authority sequence identifier from the second computing device having the group leader role;
  store the received authority sequence identifier in persistent storage of the first computing device; and
  assume, with the first computing device, a backup group leader role for the group of computing devices.

5. The article of claim 4, wherein the instructions are executable to, before detecting the loss of communication:
  acquire group configuration information from the second computing device; and
  periodically synchronize the acquired group configuration information stored on the first computing device with the group configuration information of the second computing device when the first computing device has the backup group leader role.

6. The article of claim 4, wherein the instructions to assume the group leader role with the first computing device comprise instructions executable to:
  modify the authority sequence identifier stored in the persistent storage of the first computing device;
  modify a text record for an mDNS payload of the first computing device to include the modified authority sequence identifier and an indication that the first computing device has the group leader role, wherein the mDNS payload is included in an mDNS response to an mDNS query;
  start, at the first computing device, a plurality of group services for the group of computing devices.

7. The article of claim 6, wherein the instructions are executable to:
  detect restoration of communication between the first and second computing devices;
  in response to the restoration of communication, provide a first mDNS message from the first computing device to the second computing device, the first mDNS message including the mDNS payload having the modified text record including the modified authority sequence identifier; and
  receive, at the first computing device, a second mDNS message from the second computing device, the second mDNS message including an mDNS payload having a text record including an authority sequence identifier of the second computing device and a role claimed by the second computing device.

8. The article of claim 7, wherein the instructions are executable to:
  compare the authority sequence identifier of the second computing device in the second mDNS message with the modified authority sequence identifier of the first computing device; and
  based at least on a result of the comparing, transition the second computing device to the backup group leader role while keeping the first computing device in the group leader role.

9. A system comprising a first computing device, of a group of computing devices, the first computing device comprising:
  at least one processing resource; and
  at least one non-transitory machine-readable storage medium comprising instructions executable by the at least one processing resource to:
    detect a loss of communication, via a first communication protocol, between the first computing device and a second computing device of the group of computing devices;
    after detecting the loss of communication, receive, from an entity different from the first computing device, a promote input instructing the first computing device to assume a group leader role for the group of computing devices;
    in response to receiving the promote input, send a multicast Domain Name System (mDNS) query according to an mDNS protocol for information about the second computing device currently having the group leader role, wherein the mDNS protocol is different from the first communication protocol;
    determine, at the first computing device, whether an mDNS response to the mDNS query is received from the second computing device via the mDNS protocol within a threshold period of time, wherein the threshold period of time is according to the mDNS protocol;
    in response to determining that the mDNS response to the mDNS query is received from the second computing device via the mDNS protocol within the threshold period of time, determine not to assume the group leader role with the first computing device in response to the promote input; and
    in response to determining that no mDNS response to the mDNS query is received from the second computing device within the threshold period of time, assume the group leader role with the first computing device in response to the promote input.

10. The system of claim 9, wherein the loss of communication is associated with a first network interface of the first computing device, and the instructions are executable to:
  in response to receiving the promote input, send a plurality of mDNS queries for information about the second computing device currently having the group leader role via a plurality of network interfaces of the first computing device, including the first network interface.

11. The system of claim 9, wherein the instructions are executable to:
  in response to detecting the loss of communication, output an alert via a user interface of the first computing device;
  wherein the promote input is received by the first computing device, via the user interface, after the alert is output.

12. The system of claim 9, wherein the instructions are executable to:
  before the loss of communication:
    receive, at the first computing device, a first sequence identifier from the second computing device having the group leader role;
    store a second sequence identifier, set to a value of the first sequence identifier, in persistent storage of the first computing device;
    assume, with the first computing device, a backup group leader role for the group of computing devices;
  after the loss of communication:
    modify the second sequence identifier stored in the persistent storage in response to assuming the group leader role with the first computing device;
    detect restoration of communication between the first and second computing devices;
    after detecting the restoration of communication, compare the modified second sequence identifier to the first sequence identifier; and
    in response to the comparing, keep the first computing device in the group leader role and transition the second computing device from the group leader role to the backup group leader role.

13. The system of claim 9, wherein the first communication protocol is an Internet Control Message Protocol (ICMP).

14. A method of a first computing device of a group of computing devices, the method comprising:
  detecting a loss of communication, via a first communication protocol, between the first computing device and a second computing device of the group of computing devices;
  after detecting the loss of communication, receiving, from an entity different from the first computing device, a promote input instructing the first computing device to assume a group leader role for the group of computing devices;
  in response to receiving the promote input, sending, from the first computing device via a second communication protocol different from the first communication protocol, a query for information about the second computing device currently having the group leader role;
  determining, at the first computing device, whether a response to the query is received from the second computing device via the second communication protocol within a threshold period of time, wherein the threshold period of time is according to the second communication protocol;

in response to determining that the response to the query is received from the second computing device via the second communication protocol within the threshold period of time, determining not to assume the group leader role with the first computing device in response to the promote input; and in response to determining that no response to the query is received from the second computing device via the second communication protocol within the threshold period of time, assuming the group leader role with the first computing device in response to the promote input.

15. The method of claim 14, wherein the second communication protocol is a multicast Domain Name System (mDNS) protocol.

16. The method of claim 15, wherein the first communication protocol is an Internet Control Message Protocol (ICMP).

17. The method of claim 14, comprising:
before detecting the loss of communication:
receiving, at the first computing device, a first sequence identifier from the second computing device having the group leader role;
storing a second sequence identifier, set to a value of the first sequence identifier, in persistent storage of the first computing device; and
assuming, with the first computing device, a backup group leader role for the group of computing devices;
after detecting the loss of communication:
modifying the second sequence identifier stored in the persistent storage in response to assuming the group leader role with the first computing device;
detecting restoration of communication between the first and second computing devices;
in response to detecting the restoration of communication, comparing, at the first computing device, the modified second sequence identifier to the first sequence identifier; and
in response to the comparing, keeping the first computing device in the group leader role and transitioning the second computing device from the group leader role to the backup group leader role.

18. The method of claim 17, comprising, before detecting the loss of communication:
acquiring group configuration information from the second computing device; and
periodically synchronizing the acquired group configuration information stored on the first computing device with the group configuration information of the second computing device when the first computing device has the backup group leader role.

19. The method of claim 17, comprising:
in response to detecting the restoration of communication:
sending, from the first computing device to the second computing device, a first message containing the modified second sequence identifier and an indication that the first computing device has the group leader role,
receiving, at the first computing device from the second computing device, a second message containing the first sequence identifier and an indication that the second computing device has the group leader role,
wherein the comparing comprises comparing the modified second sequence identifier to the first sequence identifier in the second message.

20. The method of claim 19, wherein the comparing reconciles which of the first and second computing devices is to be in the group leader role.

* * * * *